US011310385B1

(12) United States Patent
Bindana et al.

(10) Patent No.: US 11,310,385 B1
(45) Date of Patent: Apr. 19, 2022

(54) PORTABLE CASSETTE LOCKER FOR DOCUMENT HANDLER

(71) Applicant: Xerox Corporation, Norwalk, CT (US)

(72) Inventors: Srinivasarao Bindana, Andhra Pradesh (IN); Dara N. Lubin, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/187,904

(22) Filed: Mar. 1, 2021

(51) Int. Cl.
*H04N 1/00* (2006.01)

(52) U.S. Cl.
CPC ..... *H04N 1/00862* (2013.01); *H04N 1/00567* (2013.01)

(58) Field of Classification Search
None
See application file for complete search history.

(56) References Cited

U.S. PATENT DOCUMENTS

| | | | |
|---|---|---|---|
| 4,849,790 A * | 7/1989 | Ito | G03G 15/50 399/367 |
| 5,501,445 A | 3/1996 | Lowman et al. | |
| 5,752,697 A | 5/1998 | Mandel et al. | |
| 6,132,122 A * | 10/2000 | Robinson | B41J 13/00 400/624 |
| 8,134,757 B2 * | 3/2012 | Torimaru | G03G 15/6552 358/474 |
| 8,467,107 B2 | 6/2013 | Golding et al. | |
| 9,781,283 B1 * | 10/2017 | Wilsher | H04N 1/00541 |
| 10,488,748 B2 | 11/2019 | Takamori et al. | |
| 10,678,485 B2 * | 6/2020 | Hiratsuka | H04N 1/00323 |

FOREIGN PATENT DOCUMENTS

EP 0550033 A2 7/1993

\* cited by examiner

*Primary Examiner* — Miya J Williams
(74) *Attorney, Agent, or Firm* — Gibb & Riley, LLC

(57) ABSTRACT

A divider separates an enclosure into separate compartments that are shaped and sized to maintain sheets of media. A connector is positioned at a first end of the enclosure and the connector is shaped to connect to a document handler. The compartments are positioned to supply and receive the sheets of media to and from the document handler when the enclosure is connected to the document handler. A cover is positioned at the first end of the enclosure. The cover is adapted to open and close and allows access to the compartments. A lock is connected to the cover. The lock maintains the cover in a closed position when locked.

20 Claims, 8 Drawing Sheets

PORTABLE CASSETTE LOCKER FOR DOCUMENT HANDLER

BACKGROUND

Systems and methods herein generally relate to printers having document handlers and to devices for supplying and receiving sheets to and from document handlers.

Physical document security is a component of overall corporate security and personal privacy. While extensive systems are used to protect electronic documents once the physical documents are scanned, if a user misplaces the scanned documents or inadvertently leaves the physical documents that were scanned unattended, these can be appropriated improperly, resulting in security and privacy breaches.

While lockboxes and other physical protection devices can be used to securely maintain printed documents until authorized users arrive to collect them, there is not corresponding protection for documents input to a scanner or documents being transported to or from the scanner. One reason for this is that lockboxes and similar items are not generally portable and are, instead, usually very securely permanently mounted/installed to prevent unauthorized access to the documents therein. Because of these issues, users risk losing or forgetting originals at the printer. Unwanted visibility and poor security for the original documents while scanning/copying in an open environment heightens security and privacy concerns.

SUMMARY

Apparatuses herein include, among other components, an enclosure and a divider within the enclosure. A handle is connected to the enclosure and the handle is positioned to allow the enclosure to be transported separately from the document handler.

The divider separates the enclosure into separate compartments (e.g., an input compartment and an output compartment) and the separate compartments are shaped and sized to maintain sheets of media. Further, the divider can include one or more driven sheet feeders (nips, driven rollers, belts, etc.) and adjustable sheet guides to accommodate different sized sheets.

A connector is positioned at a first end of the enclosure. The connector is shaped to connect to a document handler (e.g., scanner) of a printer. The document handler has a removable input tray, and the enclosure is shaped and sized to replace the removable input tray. The compartments within the enclosure are positioned to supply and receive the sheets of media to and from the document handler when the enclosure is connected to the document handler.

Also, a cover is positioned at the first end of the enclosure to seal off the enclosure (the opening revealed by the cover is the only access to the compartments). The cover can be hinged on the enclosure, can slide on the enclosure, etc., to open and close. When the cover is in the open position, this allows access to the compartments.

Further, a lock mechanism (e.g., a physical key lock, an electronic lock, an app-controlled lock, etc.) is connected to the cover. The lock mechanism can have, for example, a latch physically restricting movement of the cover. Additionally, in some embodiments, an electronic communications/storage device is connected to the enclosure. The electronic communications/storage device is positioned to connect to an input/output device of the document handler when the enclosure is connected to the document handler. Further, the electronic communications/storage device is adapted to receive unlocking instructions from the input/output device of the document handler when the enclosure is connected to the document handler, and the lock is adapted to unlock upon receipt of the unlocking instructions.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, while non-transportable lockboxes can be used to securely maintain printed documents at the printer until authorized users arrive to collect them, there is not corresponding protection for documents being processed through a scanner or documents being transported to and from the scanner. In order to address these issues, the systems and methods herein provide a lockable and portable document enclosure or cassette that is attachable to a document scanner, such as a duplexing automatic document handler (DADH). The lockable portable document enclosure protects the documents while scanning, copying, handling, and transporting. The lock can be physical and/or digital. In addition, the lockable portable document enclosure can include built-in memory (e.g., USB port) to store the scanned files.

With devices herein, original documents are safely placed in an input tray that is integral with the lockable portable document enclosure, after which the cover on the lockable portable document enclosure can be locked. The lockable portable document enclosure can be attached and detached from the document handler. The input tray feeds the documents to the sheet feeders of the document handler to allow the documents to be scanned. As documents are scanned, the original documents are returned by the document handler to the output tray of the lockable portable document enclosure. The lockable portable document enclosure can then be kept locked to physically prevent access to the scanned documents within the lockable portable document enclosure.

The apparatuses herein provide a safe and secure way to transport and scan originals using existing document feeders/document handlers. These devices provide a secured mechanism to keep originals locked at the printer in the user's absence and such devices protect the documents from being accidentally left unattended or from being made accessible to unwanted individuals while being transported, etc.

Therefore, these apparatuses increase security of original documents while being scanned/handled at the printer and allow for potential scheduling of a scan job at a preferred time of the day without the owner of the documents needing to be present. The lockable portable document enclosure can be locked to the printing device and can be unlocked at a later time by the owner of the documents.

Figure 1A:
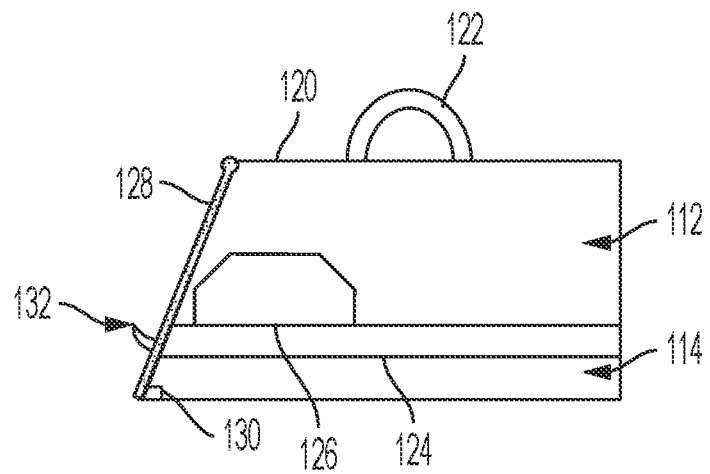
FIGS. 1A-1B are cross-sectional schematic diagrams illustrating enclosure devices herein.
Figure 1B:
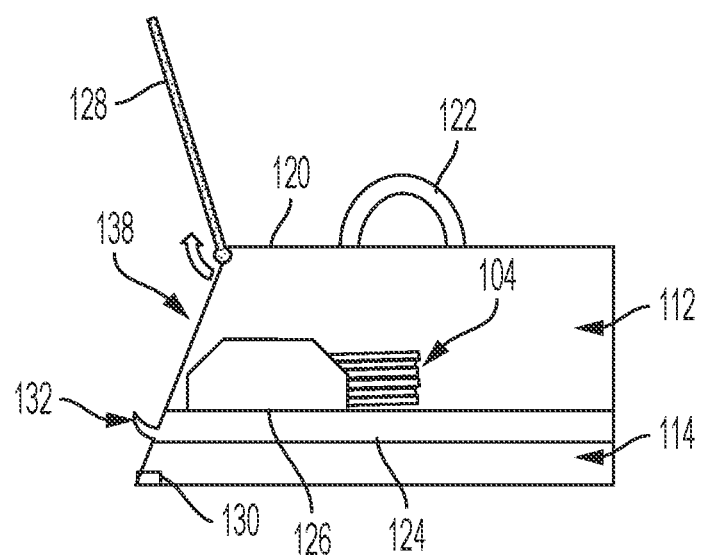

Referring now to the drawings, as shown in FIGS. 1A-1B, apparatuses herein include (among other components) an enclosure 120 and a divider 124 within the enclosure 120. A handle 122 can be optionally connected to the outside of the enclosure 120 and the handle 122 is positioned to allow the enclosure 120 to be transported (e.g., hand carried) separately from the document handler 100. Also, a connector 132 is positioned at a first end of the enclosure 120 (which is sometimes arbitrarily referred to as the front of the enclosure).

The divider 124 separates the enclosure 120 into separate compartments (e.g., an input compartment 112 that supplies sheets to an input of the document handler, and an output compartment 114 that receives sheets from an output of the document handler) that are shaped and sized to maintain sheets of media. Further, the divider 124 can include one or more driven sheet feeders (e.g., nips, driven rollers, belts, etc.) and adjustable sheet guides 126 to accommodate different sized sheets. In some examples herein, the divider 124 within the enclosure 120 is similar to a conventional sheet feeder/document handler input tray.

FIGS. 1A-1B also illustrate a hinged cover 128 that is positioned at one end (e.g., a first end) of the enclosure 120. The hinged cover 128 seals off the only opening 138 in the enclosure 120 (e.g., the first end of the enclosure can be open and can be the only opening 138 of the otherwise sealed enclosure 120). The cover 128 can be hinged on the enclosure 120 (or can, for example, slide on the enclosure 120) to open and close. When the cover 128 is in the open position, this allows access to the compartments 112, 114 (opening the cover 128 is the only way to access to the compartments 112, 114).

Further, a lock 130 mechanism (e.g., a physical key lock, an electronic lock, an app-controlled lock, etc.) is connected to the cover 128. The lock 130 mechanism can have, for example, a latch physically restricting movement of the cover 128.

As noted above, the enclosure 120 is used with a sheet feeder/document handler, such as the duplexing automatic document handler (DADH) 100 (which is commonly referred to as a document handler or scanner) shown in FIGS. 2A-2D. The document handler 100 includes a sheet feeder input tray 102 into which sheets of media 104 (e.g., printed sheets) can be loaded for feeding. The document handler 100 feeds the sheets 104 along a media path 106. The media path 106 includes various sheet guides and sheet feeders (e.g., drive nips, drive rollers, belts, etc.) that feed the sheets 104 past an optical scanner 116. The media path 106 can invert the sheets 104 to provide duplexing capabilities (e.g., scanning both sides). The media path 106 outputs the sheets 104 to an output tray of the document handler 100. Manually supplied sheets can be scanned using a platen 108.

Figure 2A:
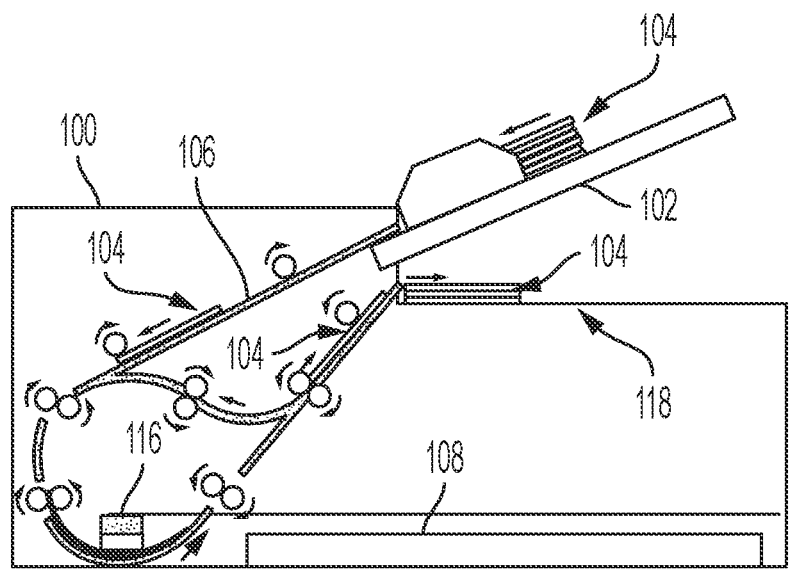
FIGS. 2A-2D are cross-sectional schematic diagrams illustrating enclosure devices and document handlers herein.
Figure 2B:
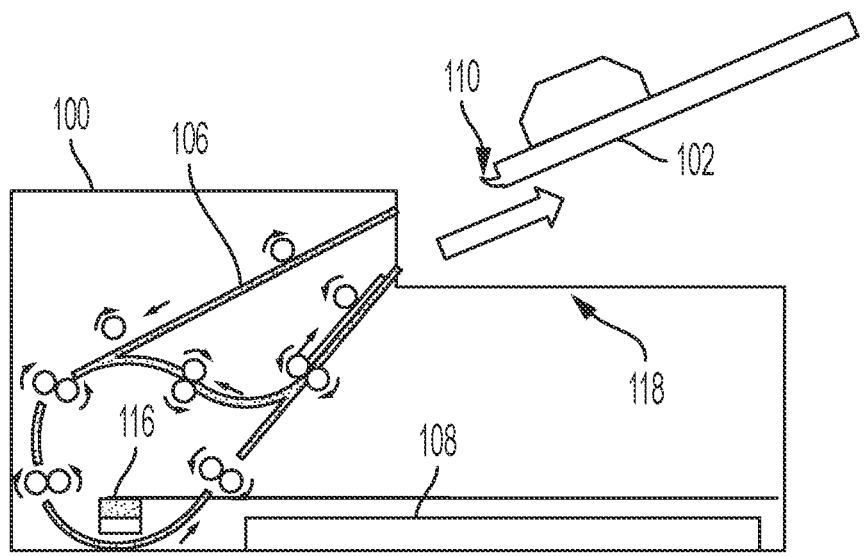

As shown in FIG. 2B, the sheet feeder input tray 102 can be removed from the document handler 100. For some document handler devices, the input tray is removable by hand; however, for other document handler devices the input tray is removable using tools. In one example, the input tray 102 can include hook-shaped connectors 110 that connect to mounting points within the document handler 100 to allow quick and easy removal/reinstallation of the input tray 102 without tools. In this non-limiting example, the distal end of the input tray 102 can be raised while the input tray 102 is pulled away from the document handler 100 to release the connectors 110 from the mounting points to allow the input tray 102 to be removed from the document handler 100.

Figure 2C:
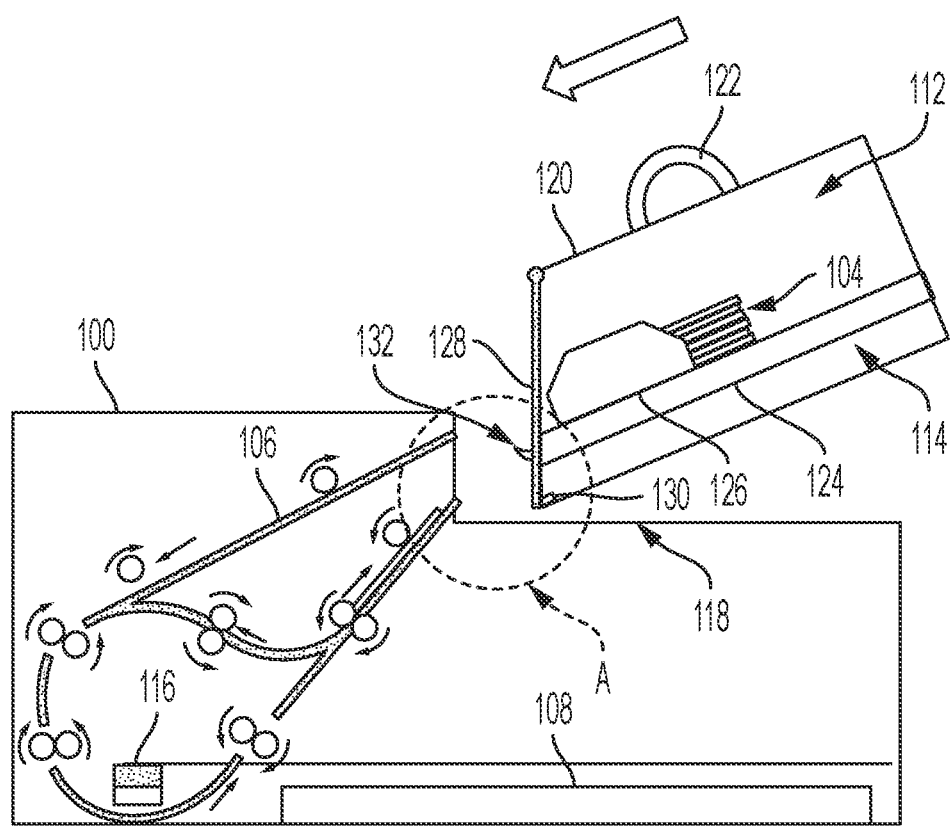

As shown in FIG. 2C, the enclosure 120 can be hand-carried into position to replace the input tray 102 on the document handler 100 removed in FIG. 2B. Note that in FIGS. 2C-2D, the area A is shown in greater detail in FIGS. 5A-6, discussed below. The connectors 132 extending from the enclosure 120 are shaped and positioned identically to the connectors 110 of the input tray 102. Therefore, the connector 132 is shaped to connect to the same mounting point(s) within the document handler to which the connectors 110 of the input tray 102 connect. Specifically, the distal end of the enclosure 120 can be raised while the enclosure 120 is pushed toward the document handler 100 (after which the distal end of the enclosure 120 is lowered) to engage the connectors 110 on the mounting points and firmly attach the enclosure 120 to the document handler 100.

Figure 2D:
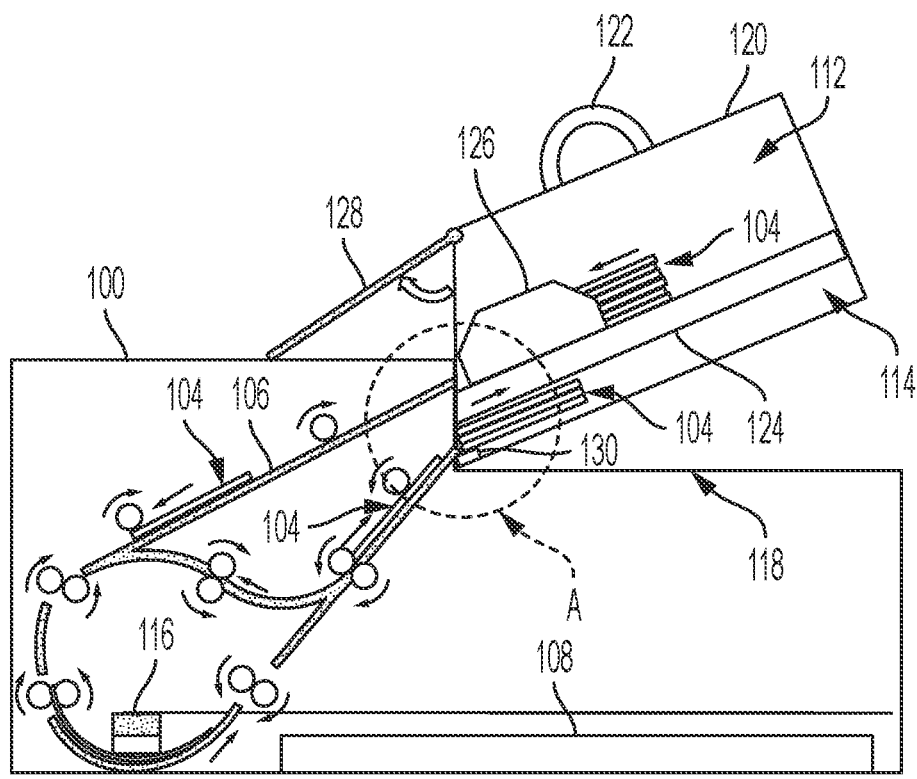

Further, the lock 130 is adapted to be unlocked and the cover 128 is adapted to be opened when the enclosure 120 is attached to the document handler 100, as shown in FIG. 2D. Therefore, the enclosure 120 connects identically to the document handler 100 as the input tray 102 and, thus, the enclosure 120 is shaped and sized to replace and substitute for (in function and purpose) the removable input tray as shown in FIG. 2D.

The compartments 112, 114 within the enclosure 120 are positioned to supply and receive the sheets of media to and from the document handler 100 when the enclosure 120 is connected to the document handler 100. For example, the sheets are fed by sheet feeders or gravity along the divider 124 into the document handler 100. In an identical manner to the input tray 102, the top surface of the divider 124 uses sheet feeders to move sheets to the interior of the document handler 100, and such sheet feeders can be powered by standard connections to the document handler 100 or self-powered.

Again, the media path 106 feeds the sheets 104 past the scanner 116 within the document handler 100 and the media path 106 outputs the sheets 104 to the output compartment 114 within the enclosure, safeguarding the scanned sheets 104. The electronic documents produced by the scan can be output by printers associated with the document handler 100 and/or can be electronically transmitted to various recipients. Note that the positioning of the enclosure 120 redirects the sheets 104 to the output compartment 114 so that the sheets 104 are not output to the output tray 118 of the document handler 100, which is still present (the output tray 118 is often part of the exterior of the document handler 100 and cannot be removed).

In operation, users can unlock (130) and open the cover 128 (as shown in FIG. 1B) in order to load sheets 104 to be scanned into the input compartment 112 on the divider 124. This can be done at a physical location that is separate from the document handler 100 (e.g., at the user's desk or workstation). Then, the user can close the cover 128 and lock the lock 130 and securely hand-carry the enclosure 120 (e.g., using the handle 122) to the document handler 100 without fear of exposing or losing the unscanned sheets 104.

As shown in FIGS. 2A-2D the input tray 102 can be removed and replaced with the enclosure 120 (after the lock 130 has been unlocked and the cover 128 opened). The document handler 100 receives/draws the sheets 104 from the input compartment 112 (e.g., the top of the divider 124), scans the sheets 104, and returns the sheets 104 to the output compartment 114 of the enclosure 120.

The user then removes the enclosure 120 from the document handler 100, closes the cover 128, and locks the lock 130. The user can replace the input tray 102 if necessary. Then, the user can collect any output (e.g., printing, copying, etc.) from printing devices associated with the document handler 100 and hand-carry the enclosure 120 back to their personal work area. During the entirety of these transportation and scanning processes, the sheets 104 are protected and secured by the enclosure 120, maintaining corporate security and personal privacy.

Figure 3A:
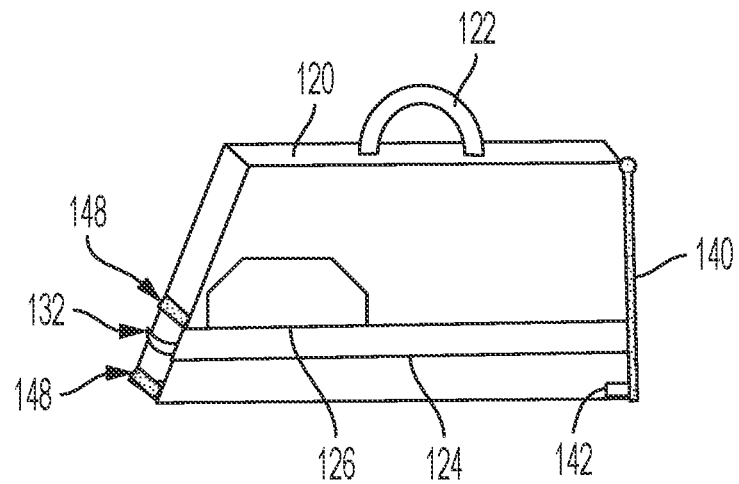
FIGS. 3A-3B are perspective-view schematic diagrams illustrating enclosure devices herein.
Figure 3B:
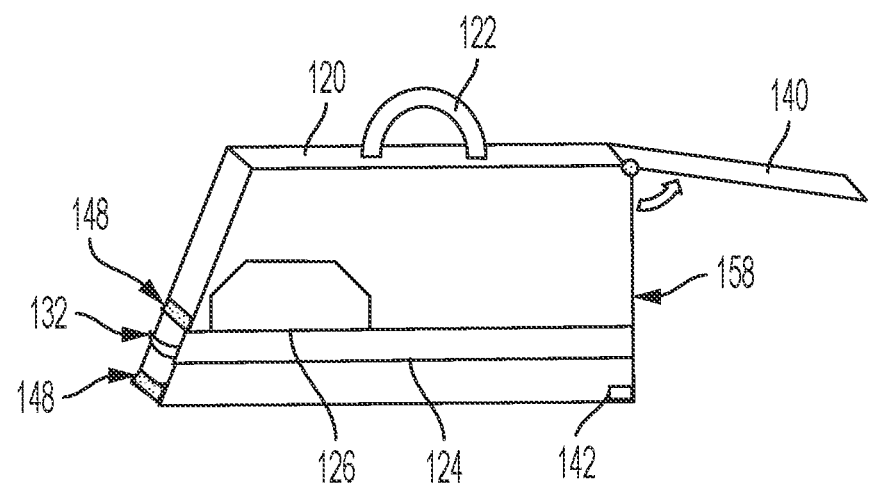

FIGS. 3A-3B illustrate in perspective view an option where the cover 140 (e.g., back cover) is on the opposite end (e.g., second end) of the enclosure 120. As shown in FIG. 3A, a lock 142 can lock this back cover 140. The back cover 140 can be opened revealing a back opening 158 to allow loading of sheets 104, as shown in FIG. 3B. Permanently uncovered small slots 148 are positioned along the otherwise closed first end of the enclosure 120 to allow the document handler 100 to draw and feed the sheets 104 to and from the first end of the enclosure 120.

The structure shown in FIGS. 3A-3B is very useful to allow users to load the sheets 104 into the back of the enclosure after the enclosure 120 has been connected to the document handler 100. For example, users may not desire to always maintain their own enclosure 120 at their personal workspace because of space limitations, aesthetics, etc. In such situations, multiple enclosures 120 may be maintained at the location of the document handler 100, with one enclosure 120 always being connected to the document handler 100. In such a system, each user brings the sheets 104 to the document handler 100, opens the back cover 140, and loads the sheets 104 into the back of an enclosure 120 that is already connected to the document handler 100. The sheets 104 are then scanned and returned to the output compartment 114 within the enclosure 120. The user can then remove the enclosure 120 from the document handler 100, close and lock the back cover 140, and carry the enclosure 120 back to their workspace to keep the sheets 104 secure during scanning and transport back to the workspace. The user can remove the sheets 104 from the enclosure 120 at their workspace. The empty enclosures 120 can be collected and returned to the location of the document handler 100 or some other central storage location. Users or other employees can connect empty enclosures 120 to the document handler 100 after each user removes the enclosure 120 from the document handler 100.

Figure 4A:
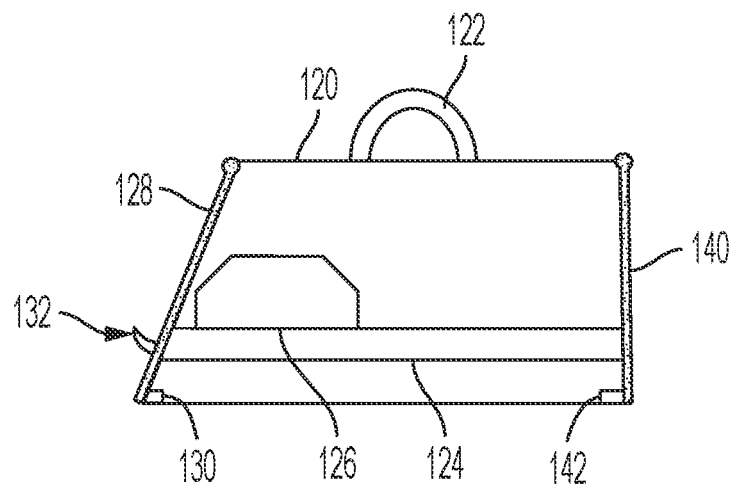
FIGS. 4A-4B are cross-sectional schematic diagrams illustrating enclosure devices herein.
Figure 4B:
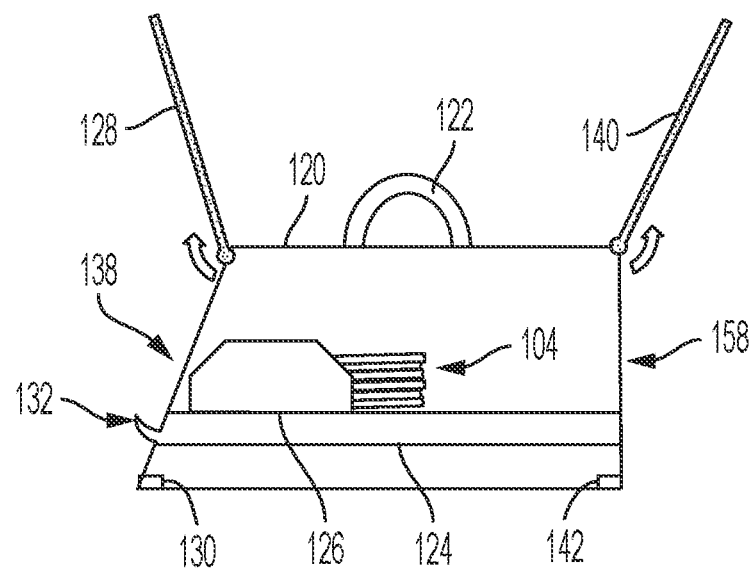

In other alternatives shown in FIGS. 4A-4B, covers 128, 140 can be connected to both ends of the enclosure 120. Multiple locks 130, 142 can be controlled in unison or each lock 130, 142 can be operated separately. The structure shown in FIGS. 4A-4B allow users the option of loading sheets 104 into the enclosure 120 before or after the enclosure 120 is connected to the document handler 100. However, with the structure shown in FIGS. 4A-4B, the permanently open slots in the first end of the enclosure 120 are eliminated, increasing the security of the enclosure compared to small security exposure afforded by the slots 148 in the structure shown in FIGS. 3A-3B.

Figure 5A:
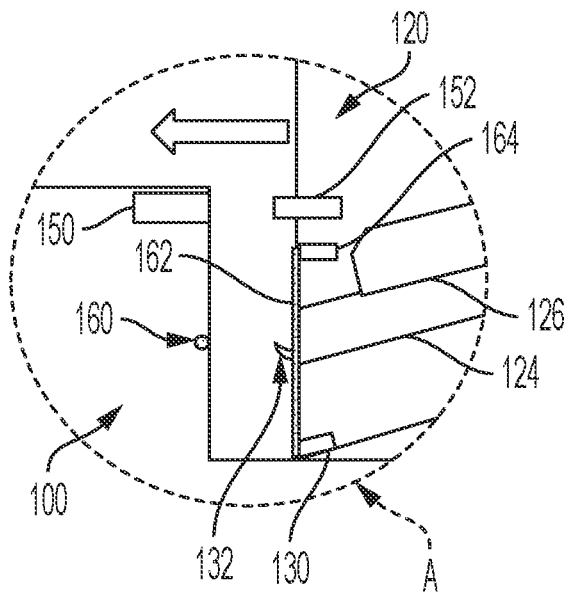
FIGS. 5A-6 are cross-sectional schematic diagrams illustrating a portion of enclosure devices and document handlers herein.
Figure 5B:
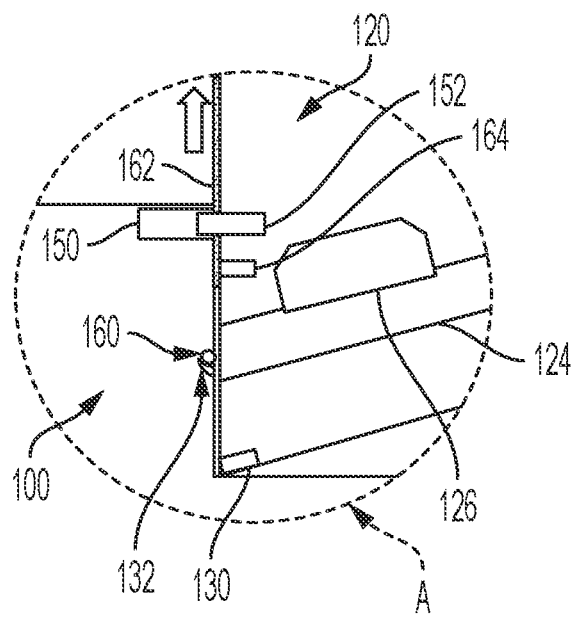
Figure 6:
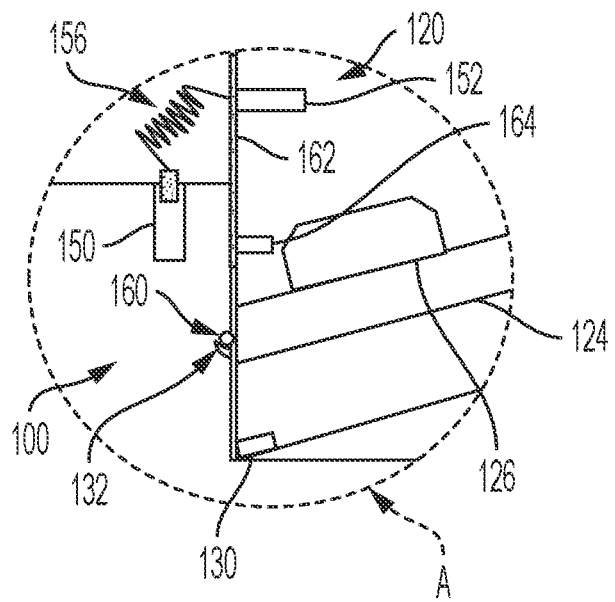

Additionally, in all embodiments herein, an electronic communications and/or electronic storage device 152 can be connected to the enclosure 120, as shown in FIG. 5A. Specifically, FIGS. 5A-6 illustrate a magnified view of only a portion (represented by the broken line circle area A) of the area shown in FIGS. 2C-2D where the enclosure 120 and the document handler 100 connect. FIGS. 5A-6 also show the mounting point 160 to which the connectors 110, 132 connect, as described above. Further, the cover 162 shown in FIGS. 5A-6 is a sliding cover that slides in the direction shown by the arrow (e.g., upward) in FIG. 5B. In one example a motor 164 can drive the sliding cover 162 to expose or cover the input compartment 112 and output compartment 114 (e.g., to seal or open the enclosure 120).

As shown in FIGS. 5A-5B, the communication/storage device 152 is positioned on the exterior of the enclosure 120 in a position so as to connect to an input/output device 150 of the document handler 100. Specifically, the arrow in FIG. 5A illustrates that when the enclosure 120 is moved to connect to the document handler 100, as shown in FIG. 5B, the communication/storage device 152 automatically physically connects to the input/output device 150 (e.g., the communication/storage device 152 slides into the input/output device 150). Specifically, just the act of moving the enclosure 120 to connect to the document handler 100 causes the communication/storage device 152 to connect to the input/output device 150, without any other user action or connection being required.

The communication/storage device 152 and input/output device 150 can be any standard connection type, whether currently known or developed in the future including twisted pair connections, RCA connections, ethernet connections, USB connections, firewire connections, etc. The communication/storage device 152 can transmit/receive data and power to and from the input/output device 150. In one example, this power connection can be used to power the motor 164 and/or sheet feeders of the enclosure 120.

Further, the communication/storage device 152 and input/output device 150 can communicate to store electronic documents resulting from the scanning process. Therefore, after the document handler 100 has performed the scanning process and produced an electronic document (which may in fact be produced by the printing device to which the document handler 100 is connected) the document handler 100 can return the scanned original sheets 104 to the output compartment 114 and the document handler 100 can also store the scanned electronic document in the communication/storage device 152 to allow the user to carry away both the scanned sheets 104 and the digital file created from the scanning.

In all embodiments herein the input/output device 150 can, in addition, transmit unlocking instructions (e.g., an electronic key or access code) to the communication/storage device 152. The unlocking instructions may be produced by the printing device to which the document handler 100 is connected, and such unlocking instructions may only be provided if a user enters a proper authorization code or other user credentials into the user interface of the printing device.

Further, the lock 130 may only remain unlocked so long as the communication/storage device 152 is connect to the input/output device 150. Therefore, upon the communication/storage device 152 physically disconnecting from the input/output device 150 (as the enclosure 120 is physically removed from the document handler 100) the lock 130 will cause the cover 162 to slide into the closed position (potentially using the action of the motor 164), thereby sealing the input and output compartments 112, 114.

In order to load sheets 104 into the input compartment 112, the user can connect (in a wired or wireless manner) an electronic key or a computerized device to the communication/storage device 152, preferably at a secure location away from the document handler 100, such as at their personal workstation. Therefore, in one example, a user may maintain the enclosure 120 at their workstation, connect the communication/storage device 152 to their personal computer that they keep at their workstation (by way of cable, wireless connection, etc.), enter the appropriate credentials to unlock the lock 130 into their computer, open the cover 162, and load the sheets 104 into the input compartment 112. Once the sheets 104 are loaded, the user can close the cover 162 and lock the lock 130 using their computer, which seals the enclosure 120 and makes the enclosure 120 ready for transport to the document handler 100.

With this option, the sliding cover 162 remains locked and closed during transport and until after the enclosure 120 has been connected to the document handler 100 and the communication/storage device 152 (again, connection of the enclosure 120 to the document handler 100 simultaneously connects to the communication/storage device 152 to input/output device 150). After the enclosure 120 has been connected to the document handler 100, the user can enter the access code or other credentials into the user interface of the printer, which causes the printer to transfer these unlocking instructions to the lock 130 (e.g., through the document handler 100, input/output device 150, and communication/storage device 152). This unlocks the lock 130 and causes the sliding cover 162 to open by sliding upward. Therefore, in this processing, the cover 162 remains closed during transport and until after connection of the enclosure 120 to the document handler 100, and the cover 162 only opens after the communication/storage device 152 receives the needed unlocking instructions or access code. This prevents access to the interior of the enclosure 120 at all times after the user locks the lock 130 while at their personal workstation using their computer.

Thus, only after the enclosure 120 is connected to the document handler and the unlocking instructions are supplied to the communication/storage device 152 will the lock 130 unlock the cover 162 to cause the cover 162 to slide to expose the input and output compartments 112, 114. These features provide robust security because the enclosure 120 remains sealed during transport and up to the point where the enclosure 120 is fully connected to the document handler 100, which reduces the likelihood of non-authorized individuals accessing the sheets 104.

FIG. 6 shows the same view shown in FIGS. 5A-5B of area A; however, in FIG. 6 a wired connection 156 is used to connect the communication/storage device 152 and input/output device 150. This allows the connection between the communication/storage device 152 and input/output device 150 to be made before the enclosure 120 is physically attached to the document handler 100. With the wired connection 156, different forms of covers can be used in place of the sliding cover 162 (e.g., hinged covers 128). Further wired connections 156, which are connected manually, can avoid any alignment issues that might occur with the physical alignment connections of the communication/storage device 152 and input/output device 150 shown in FIGS. 5A-5B.

Having the communication/storage device 152 as an integral part of the enclosure 120 also allows tracking of which users used the enclosure 120, when such use occurred, and possibly what documents were scanned. For electronic locks 130 that require user credentials to perform unlock actions, the communication/storage device 152 can record which users opened the lock and when the lock was opened. In addition, the communication/storage device 152 can record when scans were performed, which scanners were used to perform the scan, number of pages scanned, names of electronic documents produced, etc. Recording such activity helps increase security by allowing user to determine if anyone has accessed the sheets 104 within the enclosure 120 without their knowledge. This can provide theft tracking and deterrence to any such theft.

Figure 7:
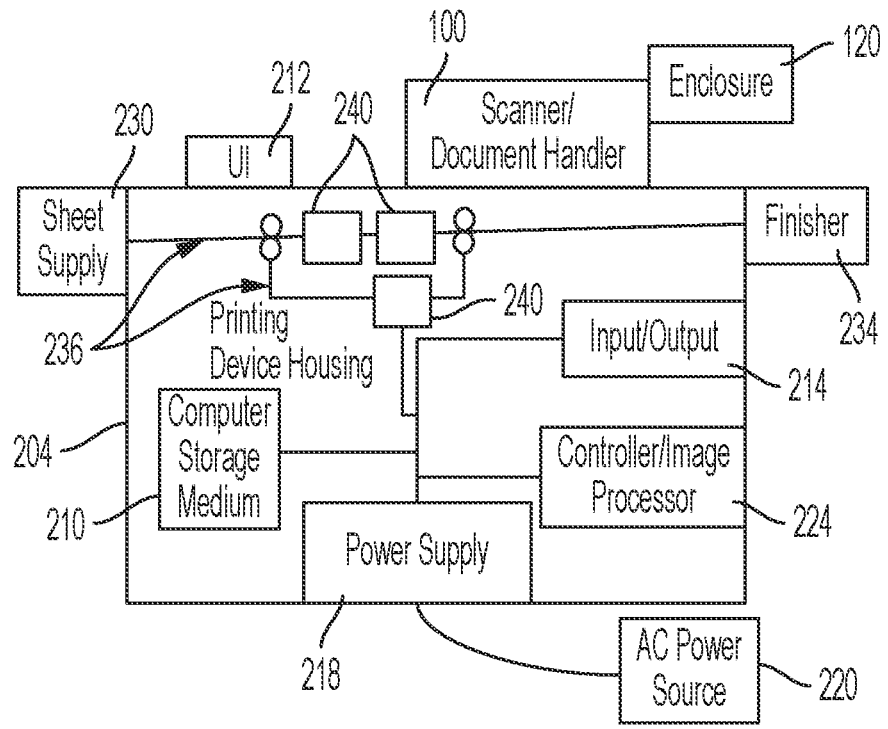
FIG. 7 is a schematic diagram illustrating printing devices herein.

FIG. 7 illustrates many components of printer structures 204 herein that can comprise, for example, a printer, copier, multi-function machine, multi-function device (MFD), etc. The printing device 204 includes a controller/tangible processor 224 and a communications port (input/output) 214 operatively connected to the tangible processor 224 and to a computerized network external to the printing device 204. Also, the printing device 204 can include at least one accessory functional component, such as a user interface (UI) assembly 212. The user may receive messages, instructions, and menu options from, and enter instructions through, the user interface or control panel 212.

The input/output device 214 is used for communications to and from the printing device 204 and comprises a wired device or wireless device (of any form, whether currently known or developed in the future). The tangible processor 224 controls the various actions of the printing device 204. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 7, a body housing has one or more functional components that operate on power supplied from an alternating current (AC) source 220 by the power supply 218. The power supply 218 can comprise a common power conversion unit, power storage element (e.g., a battery, etc.), etc.

The printing device 204 includes at least one marking device (printing engine(s)) 240 that use marking material, and are operatively connected to a specialized image processor 224 (that is different from a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 100 (automatic document feeder (ADF) duplexing automatic document handler (document handler), etc.) with an enclosure 120 connected thereto that also operate on the power supplied from the external power source 220 (through the power supply 218).

The one or more printing engines 240 are intended to illustrate any marking device that applies marking material (toner, inks, plastics, organic material, etc.) to continuous media, sheets of media, fixed platforms, etc., in two- or three-dimensional printing processes, whether currently known or developed in the future. The printing engines 240 can include, for example, devices that use electrostatic toner printers, inkjet printheads, contact printheads, three-dimensional printers, etc. The one or more printing engines 240 can include, for example, devices that use a photoreceptor belt or an intermediate transfer belt or devices that print directly to print media (e.g., inkjet printers, ribbon-based contact printers, etc.).

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", "back", "front", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. An apparatus comprising:
    an enclosure having ends;
    a divider within the enclosure, wherein the divider separates the enclosure into separate compartments, and wherein the compartments are shaped and sized to maintain sheets of media;
    a connector positioned at a first end of the ends of the enclosure, wherein the connector is shaped to connect to a document handler, wherein the compartments are positioned to supply and receive the sheets of media to and from the document handler when the enclosure is connected to the document handler;
    a cover positioned at the first end of the enclosure, wherein the cover is adapted to open and close, and allows access to the compartments; and
    a lock connected to the cover, wherein the lock maintains the cover in a closed position when locked.

2. The apparatus according to claim 1, further comprising a handle connected to the enclosure, wherein the handle is positioned to allow the enclosure to be transported separately from the document handler.

3. The apparatus according to claim 1, wherein the lock comprises at least one of:
    a physical key lock;
    an electronic lock; and
    an app-controlled lock.

4. The apparatus according to claim 1, further comprising sheet feeders connected to the divider.

5. The apparatus according to claim 1, further comprising adjustable sheet guides connected to the divider.

6. The apparatus according to claim 1, wherein the document handler comprises a removable input tray, and wherein the enclosure replaces the removable input tray.

7. The apparatus according to claim 1, wherein the cover provides the only access to the compartments.

8. An apparatus comprising:
    an enclosure having ends;
    a divider within the enclosure, wherein the divider separates the enclosure into separate compartments, and wherein the compartments are shaped and sized to maintain sheets of media;
    a connector positioned at a first end of the ends of the enclosure, wherein the connector is shaped to connect to a document handler, wherein the compartments are positioned to supply and receive the sheets of media to and from the document handler when the enclosure is connected to the document handler;
    a cover positioned at the first end of the enclosure, wherein the cover is adapted to open and close, and allows access to the compartments;
    a lock connected to the cover, wherein the lock maintains the cover in a closed position when locked; and
    an electronic storage device connected to the enclosure, wherein the electronic storage device is positioned to connect to an input/output device of the document handler.

9. The apparatus according to claim 8, further comprising a handle connected to the enclosure, wherein the handle is positioned to allow the enclosure to be transported separately from the document handler.

10. The apparatus according to claim 8, wherein the lock comprises at least one of:
    a physical key lock;
    an electronic lock; and
    an app-controlled lock.

11. The apparatus according to claim 8, further comprising sheet feeders connected to the divider.

12. The apparatus according to claim 8, further comprising adjustable sheet guides connected to the divider.

13. The apparatus according to claim 8, wherein the document handler comprises a removable input tray, and wherein the enclosure replaces the removable input tray.

14. The apparatus according to claim 8, wherein the cover provides the only access to the compartments.

15. An apparatus comprising:
   an enclosure having ends;
   a divider within the enclosure, wherein the divider separates the enclosure into separate compartments, and wherein the compartments are shaped and sized to maintain sheets of media;
   a connector positioned at a first end of the ends of the enclosure, wherein the connector is shaped to connect to a document handler, wherein the compartments are positioned to supply and receive the sheets of media to and from the document handler when the enclosure is connected to the document handler;
   a cover positioned at the first end of the enclosure, wherein the cover is adapted to open and close, and allows access to the compartments;
   a lock connected to the cover, wherein the lock maintains the cover in a closed position when locked; and
   an electronic communications device connected to the enclosure, wherein the electronic communications device is positioned to connect to an input/output device of the document handler when the enclosure is connected to the document handler,
   wherein the electronic communications device is adapted to receive unlocking instructions from the input/output device of the document handler after the enclosure is connected to the document handler, and
   wherein the lock is adapted to unlock upon receipt of the unlocking instructions.

16. The apparatus according to claim 15, further comprising a handle connected to the enclosure, wherein the handle is positioned to allow the enclosure to be transported separately from the document handler.

17. The apparatus according to claim 15, wherein the lock comprises at least one of:
   a physical key lock;
   an electronic lock; and
   an app-controlled lock.

18. The apparatus according to claim 15, further comprising sheet feeders connected to the divider.

19. The apparatus according to claim 15, further comprising adjustable sheet guides connected to the divider.

20. The apparatus according to claim 15, wherein the document handler comprises a removable input tray, and wherein the enclosure replaces the removable input tray.

* * * * *